(12) United States Patent
Luo et al.

(10) Patent No.: US 9,938,178 B2
(45) Date of Patent: Apr. 10, 2018

(54) METHODS OF MANUFACTURING GLASS ARTICLES USING ANISOTHERMAL TEMPERATURE PROFILES

(71) Applicant: CORNING INCORPORATED, Corning, NY (US)

(72) Inventors: Weiwei Luo, Painted Post, NY (US); Rohit Rai, Painted Post, NY (US); Ljerka Ukrainczyk, Painted Post, NY (US); Zheming Zheng, Horseheads, NY (US); Sam Samer Zoubi, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 36 days.

(21) Appl. No.: 14/446,974

(22) Filed: Jul. 30, 2014

(65) Prior Publication Data

US 2015/0047393 A1    Feb. 19, 2015

Related U.S. Application Data

(60) Provisional application No. 61/866,162, filed on Aug. 15, 2013.

(51) Int. Cl.
*C03B 23/023* (2006.01)
*C03C 21/00* (2006.01)
*C03B 23/035* (2006.01)

(52) U.S. Cl.
CPC ...... *C03B 23/0235* (2013.01); *C03B 23/0357* (2013.01); *C03C 21/00* (2013.01); *C03C 21/002* (2013.01); *Y02P 40/57* (2015.11)

(58) Field of Classification Search
CPC .... C03B 21/002; C03B 21/00; C03B 23/0235
See application file for complete search history.

(56) References Cited

U.S. PATENT DOCUMENTS 4,251,253 A    2/1981  Becker et al. .................. 65/267
5,232,653 A *  8/1993  Addeo .................... B29C 33/02
                                                    156/212

(Continued)

FOREIGN PATENT DOCUMENTS

AU        451175        10/1970
JP       62202828         9/1987

(Continued)

OTHER PUBLICATIONS

International Search Report and Written Opinion From the International Searching Authority; PCT/US2014/050490; dated Oct. 24, 2014; 11 Pages.

*Primary Examiner* — Queenie S Dehghan
(74) *Attorney, Agent, or Firm* — John T. Haran

(57) ABSTRACT

According to one embodiment, a method of manufacturing a glass article having a three-dimensional shape includes heating a glass article blank to a temperature above a setting temperature and coupling the glass article blank to an open-faced mold. The open-faced mold includes a molding region that has a three-dimensional shape that generally corresponds to the shape of the glass article and has an anisothermal temperature profile within the molding region. The method further includes maintaining an anisothermal temperature profile along the glass article blank and cooling the glass article blank while the glass article blank is coupled to the molding region of the open-faced mold to set the shape of the glass article.

12 Claims, 4 Drawing Sheets

(56) References Cited

U.S. PATENT DOCUMENTS

| | | | |
|---|---|---|---|
| 5,656,051 A | 8/1997 | Mares-Benavides | 65/66 |
| 5,827,345 A * | 10/1998 | Boaz | C03B 23/0235 |
| | | | 219/678 |
| RE38,450 E * | 3/2004 | Shimizu | C03B 11/127 |
| | | | 220/2.1 A |
| 8,429,936 B2 | 4/2013 | Allan et al. | 65/95 |
| 2002/0009602 A1 * | 1/2002 | Kitayama | C03B 11/088 |
| | | | 428/432 |
| 2004/0107729 A1 | 6/2004 | Fukami et al. | |
| 2012/0186301 A1 | 7/2012 | Nishimura et al. | 65/162 |
| 2012/0297828 A1 * | 11/2012 | Bailey | C03B 23/0235 |
| | | | 65/29.18 |
| 2013/0094714 A1 | 4/2013 | Ohto | 382/106 |
| 2013/0125588 A1 * | 5/2013 | Kladias | C03B 23/0258 |
| | | | 65/103 |
| 2013/0298608 A1 | 11/2013 | Langsdorf et al. | |
| 2014/0212649 A1 * | 7/2014 | Katayama | C03C 3/085 |
| | | | 428/220 |

FOREIGN PATENT DOCUMENTS

| | | |
|---|---|---|
| JP | 2001-130919 | 5/2001 |
| WO | 2004052798 | 6/2004 |
| WO | 2011141295 | 11/2011 |
| WO | 2012118612 | 9/2012 |
| WO | 2014130331 | 8/2014 |

\* cited by examiner

METHODS OF MANUFACTURING GLASS ARTICLES USING ANISOTHERMAL TEMPERATURE PROFILES

CROSS-REFERENCE TO RELATED APPLICATIONS

This application claims the benefit of priority under 35 U.S.C. § 119 of U.S. Provisional Application Ser. No. 61/866,162 filed on Aug. 15, 2013 the content of which is relied upon and incorporated herein by reference in its entirety.

FIELD

The present specification generally relates to molds for shaping glass articles and, more specifically, to one-sided molds for glass articles having a three-dimensional shape and methods of using the same to shape glass articles.

BACKGROUND

Glass articles can be incorporated as cover glasses in various consumer products, including interactive displays on consumer devices such as mobile phones and tablets. As glass articles become more widely utilized in various consumer devices, the geometric complexities of the glass articles also increases as manufacturers push the design envelope in terms of both aesthetics and function. For example, certain products may require that the glass articles be formed into complex shapes, such as curved sections that wrap around the edges of a device, thus requiring additional forming operations to achieve the desired geometry. However, the design requirements of certain products may dictate narrow tolerances of deviations away from the target shape.

Accordingly, alternative molds and methods for forming glass articles may be desired.

SUMMARY

According to one embodiment, a method of manufacturing a glass article having a three-dimensional shape includes heating a glass article blank to a temperature above a setting temperature and coupling the glass article blank to an open-faced mold. The open-faced mold includes a molding region that has a three-dimensional shape that generally corresponds to the shape of the glass article and has an anisothermal temperature profile within the molding region. The method further includes maintaining an anisothermal temperature profile along the glass article blank and cooling the glass article blank while the glass article blank is coupled to the molding region of the open-faced mold to set the shape of the glass article.

In another embodiment, a molding apparatus for forming a glass article includes an open faced mold that includes a molding region. The molding region has a contact face that has a three-dimensional shape that generally corresponds to a shape of the glass article. A plurality of vent holes is positioned within the molding region of the open-faced mold and extends through the contact face. The vent holes are in fluid communication with a vacuum pump. At least one cooling passage is positioned in the open-faced mold, and includes a portion that is positioned proximate to the molding region and is fluidly isolated from the plurality of vent holes and the contact face of the open-faced mold. The cooling passage generates an anisothermal temperature profile across the glass article.

In yet another embodiment, a method of manufacturing a glass-article having a three-dimensional shape includes heating a glass article blank to a temperature above a setting temperature and coupling the glass article blank to an open-faced mold. The open-faced mold has a three-dimensional shape that differs from a target shape for the glass article. Additionally, the open-faced mold has an anisothermal temperature profile within the molding region. The method further includes maintaining an anisothermal temperature profile along the glass article blank and cooling the glass article blank to a temperature below a viscous temperature while the glass article blank is coupled to the molding region of the open-faced mold to set the shape of the glass article, and releasing the glass article from the open-faced mold.

Additional features and advantages of various embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 3:
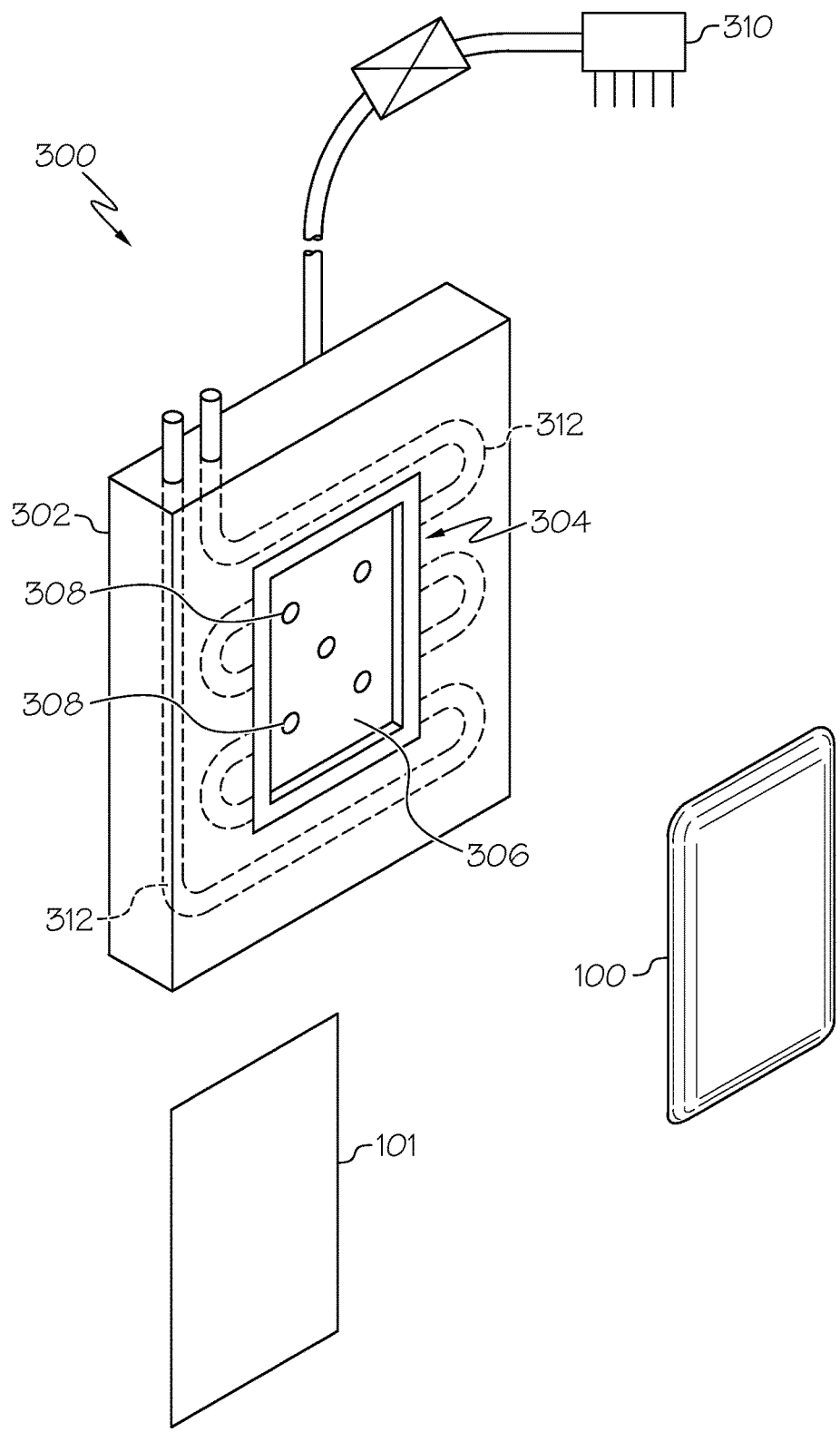
FIG. 3 schematically depicts a front perspective view of a mold and a glass article according to one or more embodiment shown or described herein.

Reference will now be made in detail to various embodiments, examples of which are illustrated in the accompanying drawings. Whenever possible, the same reference numerals will be used throughout the drawings to refer to the same or like parts. FIG. 3 schematically depicts an embodiment of a mold for use in conjunction with the molding methods described herein. In one embodiment, the method for manufacturing a glass article having a three-dimensional shape may generally include heating a glass article blank to a temperature above a setting temperature and coupling the glass article blank to an open-faced mold. The open-faced mold includes a molding region that has a three-dimensional shape that generally corresponds to the shape of the glass article and has an anisothermal temperature profile within the molding region. The method further includes cooling the glass article blank while the glass article blank is coupled to the molding region of the open-faced mold to set the shape of the glass article. Various embodiments of methods for manufacturing glass articles having a three-dimensional shapes as well as molds for use therein will be described in further detail herein with reference to the figures.

Figure 1A:
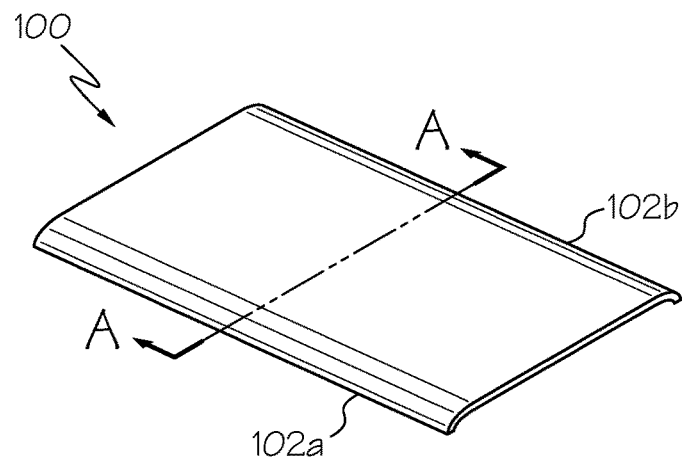
FIG. 1A schematically depicts a top perspective view of a glass article having two bent sides according to one or more embodiment shown or described herein.
Figure 1B:
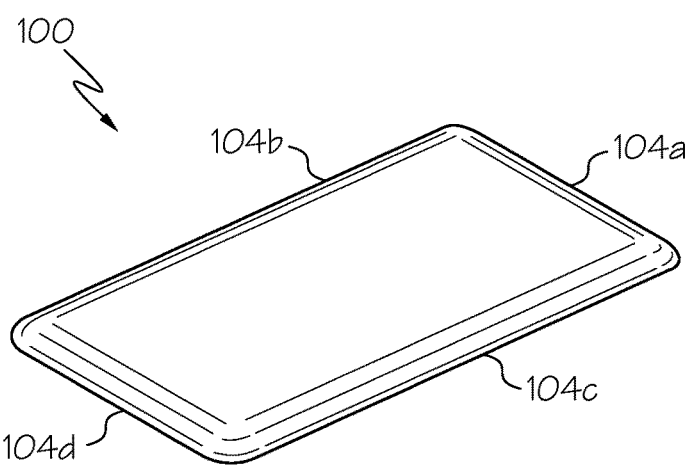
FIG. 1B schematically depicts a top perspective view of a glass article having four bent sides according to one or more embodiment shown or described herein.
Figure 1C:
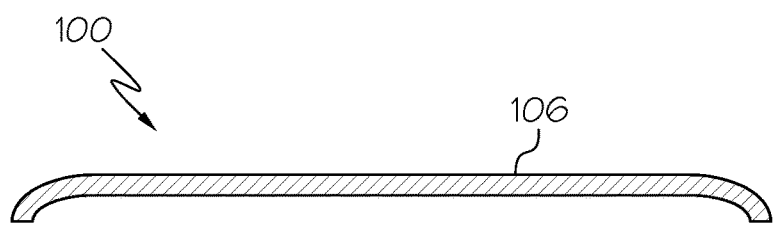
FIG. 1C schematically depicts a top cross-sectional view of the glass article of FIG. 1 shown along line A-A according to one or more embodiment shown or described herein.

Referring now to FIGS. 1A-1C, glass articles manufactured according to the present disclosure are shown. The glass articles may be incorporated into consumer products, such as smartphones or tablet computers. Various techniques can be utilized to form the glass article 100 such that the glass article has a three-dimensional shape. As used herein, the phrase "three-dimensional shape" means that the glass article generally has a shape that, at least in part, deviates from planar. For example and without limitation, the glass article 100 can have one of a number of three-dimensional shapes, such as a sled shape in which edges 102a, 102b curve away from a central portion, as depicted in FIG. 1A, or a dish shape in which edges 104a, 104b, 104c, 104d curve away from a central portion, as depicted in FIG. 1B. In various embodiments, the glass article 100 may also have a substantially flat area 106, shown in the cross-sectional view of the glass article 100 schematically depicted in FIG. 1C. Utilizing the forming techniques described herein may provide a glass article which has a substantially flat area that exhibits low deviation from a planar configuration, for example, by an amount of less than or equal to about 200 µm across the central portion of the glass article 100.

The strength and mechanical reliability of the glass article 100 is a function of its surface defect or flaw size density distribution and the cumulative exposure of the material to stress over time. For example, the glass article 100 depicted in FIG. 1A or FIG. 1B may be subjected to various kinds of thermal and mechanical stresses during manufacturing, for example, caused by forming, molding, and polishing. In particular, the glass article 100 may exhibit a high stress field at positions proximate a highly contoured portion of the molding region of a mold (e.g., at points near the bent edges 102a and 102b) and a low stress field at positions proximate to less contoured portions of the molding region of a mold (e.g., at points near substantially flat area 106 depicted in FIG. 1C). In some embodiments, the glass article 100 is further subjected to stresses during strengthening processes, for example, in ion exchange processing.

In one example, the glass article 100 is subjected to stress resulting from in-plane and through-thickness thermal gradients in the glass. Such thermal gradients can result from the different heating and cooling rates that a glass article blank 101 (depicted in FIG. 3) is subjected to as the glass article blank 101 is formed into a glass article 100. For example, these thermal gradients may be imparted to the glass article blank 101 from the mold 300 (depicted in FIG. 3) which is used to form the glass article 100, different heating and cooling rates of the center of the mold and the edge of the mold, different contact conditions between the glass article blank 101 and the mold 300, or the like. These thermal gradients can induce internal stresses to the glass article 100 and/or cause undesired distortions or warpage of the glass article 100. However, the thermal gradients can be utilized to impart controlled distortions or warpage in the glass article 100. For example, in various embodiments, thermal gradients may cause the glass article blank 101 to warp into a desired three-dimensional shape. When these thermal gradients are introduced to the glass article blank 101 within a particular range of temperatures, the glass article 100 may set with the warp after the glass article 100 is allowed to cool. The warp thereby modifies the final three-dimensional shape of the glass article 100. Alternatively, the thermal gradients can be utilized to impart controlled distortions or warpage in the glass article in excess of design tolerances in order to compensate for subsequent warp of the glass article 100 caused by downstream manufacturing processes.

Figure 2:
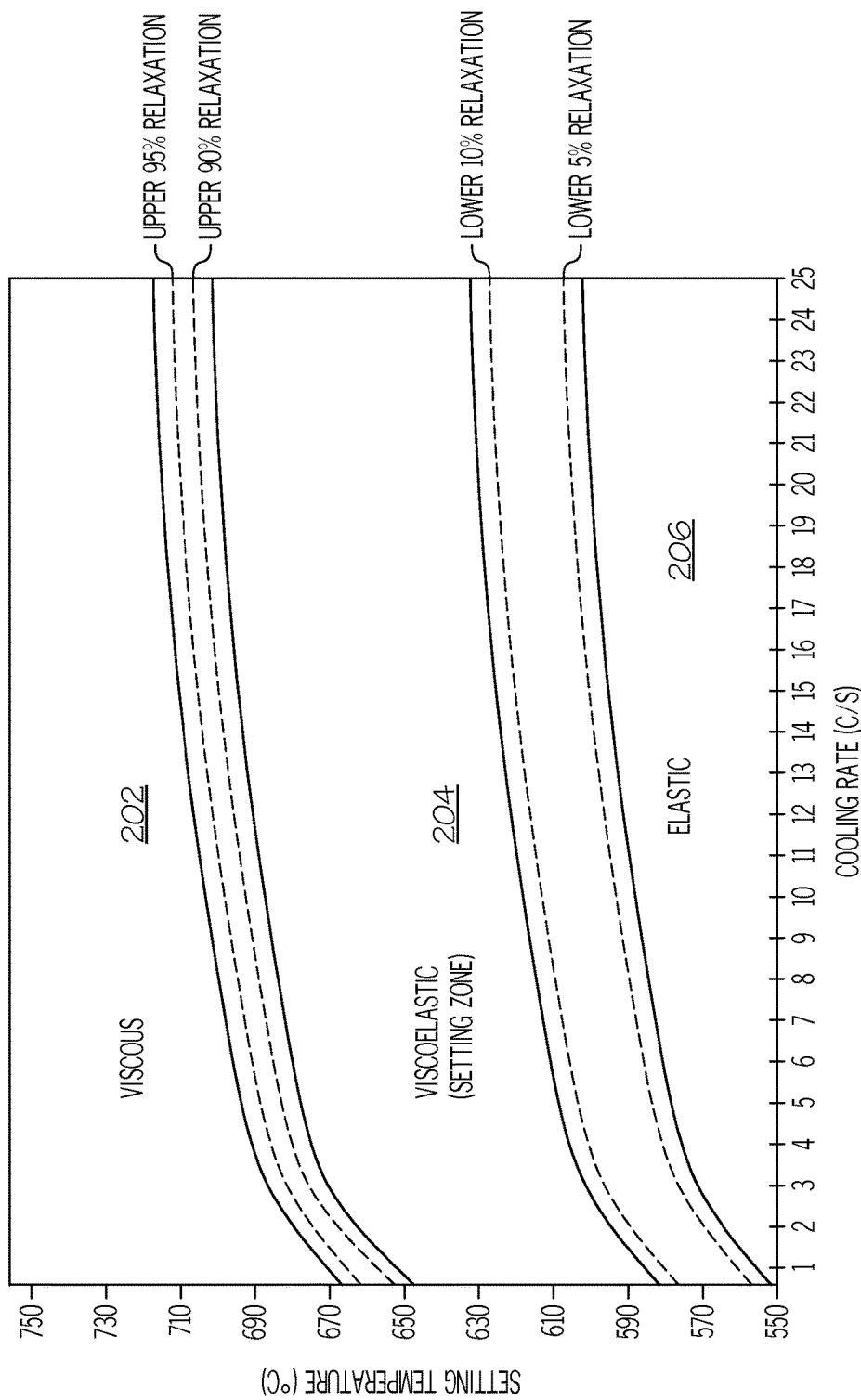
FIG. 2 schematically depicts relaxation of a glass relating to its temperature and cooling rate according to one or more embodiment shown or described herein.

FIG. 2 is a plot illustrating the relaxation of a glass composition as a function of cooling rate in accordance with one or more embodiments described herein. In the plot, the x-axis represents the cooling rate (in degrees Celsius (C.) per second (s)), while the y-axis represents the setting zone temperature (in degrees Celsius (C.)). It is to be understood that the values presented on the graph are illustrative in nature, and may vary with the glass composition. The plot illustrates a viscous zone 202, a viscoelastic or setting zone 204, and an elastic zone 206. As shown in FIG. 2, the viscous zone 202 refers to a state in which greater than about 95% of stresses in the glass have relaxed. The viscoelastic or setting zone 204 refers to a state in which from about 90% of the compressive stresses to about 10% of the compressive stresses in the glass have relaxed. The elastic zone 206 refers to a state in which less than about 5% of the compressive stresses in the glass have relaxed. In some embodiments, the boundaries between the recited viscosity zones may vary depending on the particular embodiment. For example, the transition between the viscous to the viscoelastic zones may occur from about 90% to about 95% relaxation and the transition between the viscoelastic and elastic zones may occur from about 5% to about 10% relaxation.

When a glass article blank 101 is to be formed into a glass article, the glass article blank 101 is heated to a temperature at which the glass article blank 101 is no longer in the elastic zone 206. In various embodiments, the glass article blank 101 is heated to a temperature above a setting temperature. For a given cooling rate, the setting temperature is the temperature below which stresses can develop in the glass. The temperature to which the glass article blank 101 is heated can be selected depending on various factors. In some embodiments, when the glass article blank 101 is heated to the temperature above the setting temperature, the glass article blank 101 enters the viscous zone 202 or the viscoelastic zone 204. Once heated, the glass article blank 101 is introduced to a mold 300 for shaping.

FIG. 3 illustrates one example of a mold 300 for forming a glass article having a three-dimensional shape in accordance with one or more embodiments described herein. As shown in FIG. 3, mold 300 includes an open-faced, single-sided mold form 302. The mold form 302 can be made of any suitable material, such as aluminum, nickel, cast iron, or bronze, and may be uncoated or coated with a corrosion-resistant coating or a thermal barrier coating. The mold form 302 includes a molding region 304 that has a contact face 306. Contact face 306 has a three-dimensional shape that generally corresponds to the shape of a glass article to be formed. Although the three-dimensional shape of the contact face 306 generally corresponds to the shape of the glass article, the shape of the contact face 306 can differ from the finished design shape of the glass article. As discussed hereinabove, the rate at which the glass article blank 101 is cooled can cause the glass article blank 101 to warp such that the glass article 100 has a shape that differs from, but generally corresponds to, the shape of the contact face 306 of the molding region 304. The amount by which the shape of the contact face 306 differs from the shape of the glass article 100 can vary depending on the particular requirements of the end-user application into which the glass article 100 is installed. In general, for end-user applications in which that glass article 100 covers a display, high-dimensional accuracy within the flat area 106 may be desired, while dimensional variation at positions outside of the flat area 106 may be acceptable.

A plurality of vent holes 308 are positioned within the molding region 304 of the open-faced mold form 302, and extend through the contact face 306. The vent holes 308 are in fluid communication with a vacuum pump 310. The vent holes 308 enable the glass article blank 101 to be maintained in intimate contact with the mold 300 by a pressure imbalance across the glass article blank 101 without contacting a face of the glass article blank 101 opposite the mold form 302. Reducing or eliminating contact with the glass article blank 101 can reduce defects present in the final glass article 100.

In various embodiments, the mold 300 is heated to an elevated temperature before the glass article blank 101 is coupled. In some embodiments, the mold 300 is heated to a temperature above ambient temperature that is below the setting temperature of the glass. The mold 300 can be heated using any of a variety of conventional techniques. For example, heating elements may be placed at the ceiling of the furnace, located above the mold and in close proximity to the edges of the mold, or embedded in the mold. Such heating elements may be made of silicon carbide, tungsten, nichrome, or the like. In some instances, an emitter plate may be used in conjunction with ceiling-mounted heating elements to provide more uniform heating. The heated glass article blank 101 is introduced into molding region 304 of the mold 300 and the vacuum pump draws fluid through the vent holes 308 to bring the heated glass article blank 101 into contact with the heated contact face 306. The glass article blank 101 is held in position on the mold form 302 by at least a partial vacuum created by the vacuum pump 310 along the contact face 306.

The mold 300 may further include at least one cooling passage 312, illustrated in FIG. 3 by dashed lines. In various embodiments, the cooling passage 312 can provide a fluid cooling stream to the mold form 302 at positions adjacent to the molding region 304. The cooling passage 312 may be positioned in the mold 300 in a serpentine pattern (as shown in FIG. 3), a swirl pattern, or another pattern that generates a desired temperature profile across the contact face 306. In some embodiments, the fluid cooling stream incorporates a gas that is inert to the mold 300 in the temperature range in which the mold 300 operates, for example air, nitrogen, helium, neon, or the like, although other fluid cooling streams, and other cooling mechanisms, can be employed. In the depicted embodiment, the cooling passage 312 includes a portion that is positioned proximate to the molding region 304 and is fluidly isolated from the vent holes 308 and the contact face 306 of the mold 300. Accordingly, when the fluid cooling stream is introduced into the cooling passage 312, the cooling passage 312 cools a portion of the mold 300 proximate to the molding region 304 with the fluid cooling stream. The cooling passage 312 generates a non-uniform, anisothermal temperature profile across the contact face 306. Restated, the cooling passage 312 can be used to control the temperature of portions of the mold 300 such that a first portion of the mold 300 has a first temperature and a second portion of the mold 300 has a second temperature different from the first temperature. As such, the mold 300 exhibits an anisothermal temperature profile within the molding region 304. In some embodiments, a fluid heating stream, rather than a fluid cooling stream, can be introduced through one or more of the cooling passages 312 to generate a thermal gradient across the thickness of the glass article 100.

The flow rate of the fluid cooling stream through the cooling passage 312 can be modified to generate one of a plurality of anisothermal temperature profiles within the flat area 106. In some embodiments, the temperature of the contact face 306 at positions proximate to the edges of the molding region 304 (i.e., regions A and C depicted in FIG. 3) is greater than the temperature of the contact face 306 at positions distal from the edges of the molding region 304 (i.e., region B in FIG. 3). In other embodiments, the temperature of the contact face 306 at positions proximate to the edges of the molding region 304 is less than the temperature of the contact face 306 at positions distal from the edges of the molding region 304. While FIG. 3 illustrates three vertical regions (A, B, and C) representing various regions of contact face 306 having different temperatures from one another, it is to be understood that the regions may correspond to different shapes, sizes, and orientations.

In general, the mold 300 and glass article blank 101 are both heated to desired initial temperatures above the ambient temperature in which the mold 300 is positioned. The glass article blank 101 is heated to a temperature greater than the elastic temperature range for the glass composition. The glass article blank 101 is brought into contact with the contact face 306 of the mold 300. With the glass article blank 101 in contact with the contact face of the mold 300, the vacuum pump 310 draws fluid through the vent holes 308, reducing the pressure along the side of the glass article blank 101 positioned proximate to the contact face 306. The vacuum pump 310 maintains a pressure imbalance across the glass article blank 101, thereby clamping the glass article blank 101 to the contact face 306 of the mold 300. The pressure imbalance caused by the vacuum pump 310 may overcome the strength of the glass article blank 101 at the elevated temperature so that the glass article blank 101 will conform to the shape of the contact face 306 of the mold 300.

The temperature of the glass article blank 101 and the mold 300 are reduced from the initial temperatures. As the temperature of the glass article blank 101 decreases, the glass article blank 101 will continue to conform to the shape of the contact face 306. As the fluid cooling stream is directed through the cooling passages 312, the fluid cooling stream draws heat away from the contact face 306 by conduction and/or convection, the mold 300 acts as a heat sink to the glass article blank 101, drawing heat away from the glass article blank 101. As the temperature of the glass article blank 101 is reduced, the strength of the glass article blank 101 increases. Additionally, as the temperature of the glass article blank 101 and the mold 300 decrease, the glass article blank 101 and the mold 300 will reduce in size due to the respective coefficients of thermal expansion. However, because the glass article blank 101 and the mold 300 likely have different coefficients of thermal expansion, the relative change in size of the glass article blank 101 and the mold 300 due to the variations in thermal expansion may induce stress into the glass article blank 101. Because the glass article blank 101 is simultaneously dropping, in temperature, stresses induced to the glass article blank 101 as the glass article blank 101 is being cooled may be maintained in the glass article 100 at a temperature in the elastic temperature range.

Additionally, because an anisothermal temperature gradient is maintained on the glass article blank 101 in the through-thickness direction and/or the in-plane direction of the glass article blank 101, portions of the glass article blank 101 at higher temperatures may tend to expand relative to portions of the glass article blank 101 at lower temperatures. The variation in expansion between portions of the glass article blank 101 may introduce stress into the glass article blank 101 as the glass article blank 101 reduces in temperature through the viscoelastic temperature range towards the elastic temperature range. The profile of the glass article blank 101, therefore, may change when comparing the profile at which the two- or three-dimensional shape is set into the glass article blank 101 to the profile of the glass article 100 at room temperature. In particular, the portions of the glass article blank 101 that are maintained at elevated temperatures may tend to contract more than the portions of the glass article blank 101 that are maintained at comparatively lower temperatures. The contraction of certain portions of the glass article 100 may tend to warp the glass article 100 away from the shape of the contact face 306 of the mold 300.

Because the rate at which heat is drawn away from the glass article blank 101 corresponds to the rate at which the cooling passages 312 draw heat away from the contact face 306, the anisothermal temperature profile of the contact face 306 of the mold 300 can cause a similar anisothermal temperature profile, or thermal gradient, to be generated across the glass article blank 101. The anisothermal temperature profile is generated across the glass article blank 101 as FIGS. 4 and 5 illustrate displacement in the glass article blank 101 resulting from thermal gradients generated across the glass article blank 101 due to the cooling passages 312 in the mold 300.

Figure 4:
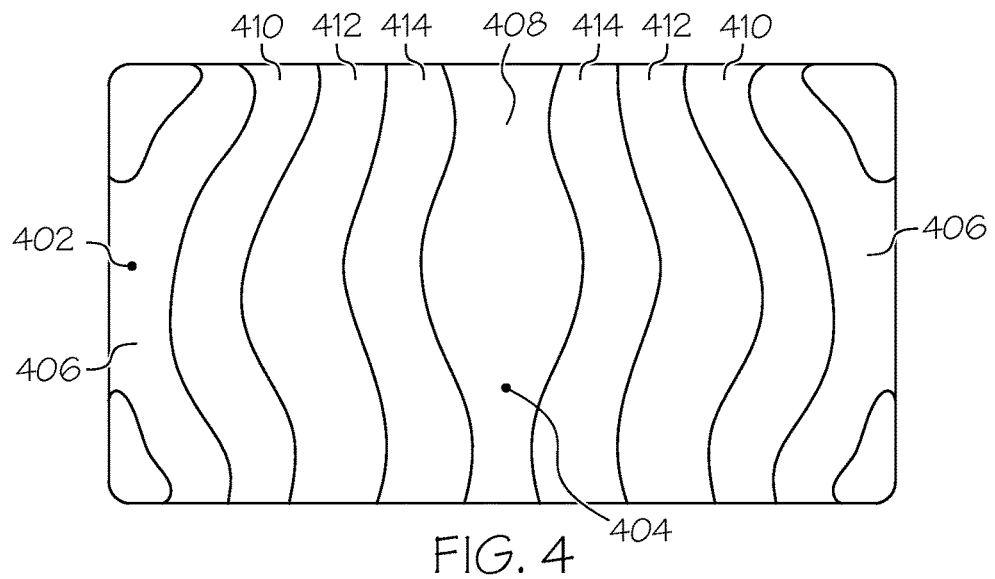
FIG. 4 schematically depicts modeling results of out-of-plane displacement that results from an in-plane temperature gradient according to one or more embodiment shown or described herein.

FIG. 4 depicts displacement resulting from a thermal gradient across an in-plane direction of the glass article blank 101. In FIG. 4, the temperature of the glass article blank 101 at a point 402 at a position proximate the edges of the glass article blank 101 is greater than a temperature of the glass article blank 101 at a point 404 at a position distal from the edges of the glass article blank. Thus, points proximate the edge of the glass article blank 101 (e.g., points within region 406) exhibit greater cumulative displacement than points distal (e.g., points within region 408) from the edges of the glass article blank 101, and the points within the region 406 have greater displacement than the points within the region 408. In various embodiments, the displacement within regions 410, 412, and 414 falls within the displacement in the region 406 and the region 408. Accordingly, when the contact face 306 of the mold 300 generates such a thermal gradient across the glass article blank 101, the edges of the glass article blank 101 will tend to deflect from the contact face 306 of the mold 300. Similarly, if the temperature of the glass article blank 101 at a point positioned proximate to the edges of the glass article blank 101 is less than a temperature of the glass article blank 101 at a point positioned distal from the edges of the glass article blank 101, the edges of the glass article blank 101 will tend to deflect toward the contact face 306 of the mold 300. In various embodiments, the anisothermal temperature profile, and the thermal gradient caused by the anisothermal temperature profile may be controlled by adjusting the flow rate of the fluid cooling stream through the cooling passage 312. Adjusting the flow rate of the fluid cooling stream, therefore, may provide some control over the shape of the glass article 100 in addition to that provided by the contours of the mold 300.

Figure 5:
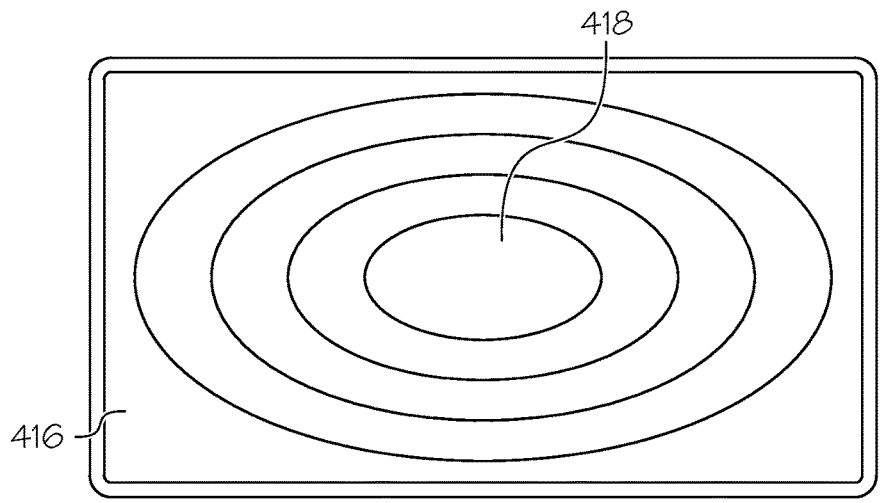
FIG. 5 schematically depicts modeling results of out-of-plane displacement that results from a through-thickness temperature gradient according to one or more embodiment shown or described herein.

FIG. 5 illustrates displacement resulting from a thermal gradient through a thickness of the glass article blank 101. In FIG. 5, the temperature of a face of the glass article blank 101 proximate the contact face 306 is less than a temperature of a face of the glass article blank 101 at a distal position from the contact face 306. Thus, the face of the glass article blank 101 proximate the contact face 306 exhibits less thermal expansion than the face of the glass article blank 101 at a distal position from the contact face 306. Accordingly, the glass article blank 101 tends to warp into a bow-like shape (e.g., positive displacement within a region 416 relative to a region 418 where the positive direction is away from the mold). Similarly, if the temperature of a face of the glass article blank 101 proximate the contact face 306 is greater than a temperature of a face of the glass article blank 101 distal from the contact face 306, the glass article blank 101 tends to warp into a dome shape.

In some embodiments, a heating element (not shown) is positioned in the mold 300 opposite from and spaced apart from the contact face 306. The heating element, along with the cooling passage 312 of the mold 300 can generate a thermal gradient through the thickness of the glass article 100. Restated, the face of the glass article 100 in contact with the contact face 306 can have a temperature different from a temperature of the face of the glass article 100 spaced apart from the contact face 306. However, it should be understood that inclusion of a heating element is optional and that a heating element need not be employed to generate a thermal gradient through the thickness of the glass article 100.

In various embodiments, the flow rate of the fluid cooling stream can be adjusted to alter the thermal gradient across an in-plane direction of the glass article blank 101 and/or through a thickness of the glass article blank 101. By altering the thermal gradient in the glass article blank 101, the glass article blank 101 can be formed such that the three-dimensional shape of the glass article 100 generally corresponds to a desired design shape for the glass article 100. In particular, the thermal gradient can be controlled to cause a pre-determined warp of the glass article blank 101 that contributes to the three-dimensional shape of the glass article 100. Methods for manufacturing a glass article 100 with a three-dimensional shape using the mold 300 will now be described in more detail.

According to an exemplary method, a glass article blank 101 is heated to a temperature above a setting temperature. In various embodiments, the glass article blank 101 is heated to a temperature such that the glass article blank 101 is in a viscous state. In some embodiments, the glass article blank 101 is heated to a temperature at which greater than about 75% of the stresses of the glass article blank 101 are relaxed for a given cooling rate. Other temperatures may be utilized depending on the requirements of the glass composition and/or glass article 100. For example, the glass article blank 101 may be heated to a temperature at which greater than about 80% of the stresses of the glass are relaxed for a given cooling rate, for example greater than about 85% of the stresses of the glass are relaxed for a given cooling rate, for example greater than about 90% of the stresses of the glass are relaxed for a given cooling rate, for example greater than about 95% of the stresses of the glass are relaxed for a given cooling rate.

In various embodiments, the mold 300 is preheated to an elevated temperature above ambient temperature. The mold 300 can be heated to a temperature less than the temperature to which the glass article blank 101 is heated. For example, the mold 300 can be heated to a temperature at which the glass article blank 101 would be in a viscoelastic state. In various embodiments, after the mold is preheated, the fluid cooling stream is passed through the cooling passages 312 of the mold 300 to further control the temperature of the mold 300. In particular, the fluid cooling stream is passed through the cooling passages 312 to control a first portion of the mold 300 to have a first temperature and a second portion of the mold 300 to have a second temperature such that when the glass article blank 101 is coupled to the mold 300, the mold 300 may have an anisothermal temperature profile within the molding region 304.

Next, the glass article blank 101 is coupled to the mold 300 such that the glass article blank 101 is brought into at least partial contact with the contact face 306 of the molding region 304. The glass article blank 101 is then conformed to the contact face 306 by enabling the vacuum pump 310, which draws fluid through the vent holes 308, thereby bringing the glass article blank 101 into contact with the contact face 306 and holding the glass article blank 101 in position on the contact face 306.

The glass article blank 101 is cooled while the glass article blank 101 is coupled to the molding region 304 of the mold 300 to set the shape of the glass article 100 into the glass article blank 101. For example, the mold 300 can act as a heat sink, drawing the heat away from the glass article blank 101. As described above, the flow rate of the fluid cooling stream can be controlled to adjust the cooling rate of the contact face 306 and glass article blank 101. While the glass article blank 101 is cooled from the elevated temperature and remains in contact with the contact face 306, a thermal gradient may be maintained through a thickness and/or across an in-plane direction of the glass article blank 101. The thermal gradient may be caused by different cooling rates at different locations along the surfaces of the glass article blank 101. In one embodiment, the heat conducted away from the face of the glass article blank 101 that contacts the mold 300 may be greater than the heat conducted and/or convected away from the side opposite the mold 300, thereby maintaining a thermal gradient through the thickness of the glass article blank 101. In some embodiments, while one side of the glass article blank 101 (e.g., the face of the glass article blank 101 proximate the contact face 306) is cooled, a side of the glass article blank 101 opposite the side that contacts the mold 300 can be heated using a heating element to generate or modify a thermal gradient through the thickness of the glass article blank 101.

After cooling, the glass article 100 is decoupled from the mold 300. In various embodiments, the glass article 100 is decoupled from the mold 300 when a maximum temperature of the glass article 100 is within a viscoelastic temperature range of the glass article 100 for a given cooling rate. However, in some embodiments, the glass article 100 is decoupled from the mold 300 when a maximum temperature of the glass article is within an elastic temperature range of the glass article 100 for a given cooling rate. For example, the glass article 100 can be decoupled from the mold 300 at a temperature at which less than about 5% of the stresses of the glass are relaxed for a given cooling rate, for example a temperature at which less than about 10% of the stresses of the glass are relaxed for a given cooling rate, for example a temperature at which less than about 15% of the stresses of the glass are relaxed for a given cooling rate, for example a temperature at which less than about 20% of the stresses of the glass are relaxed for a given cooling rate.

Figure 6:
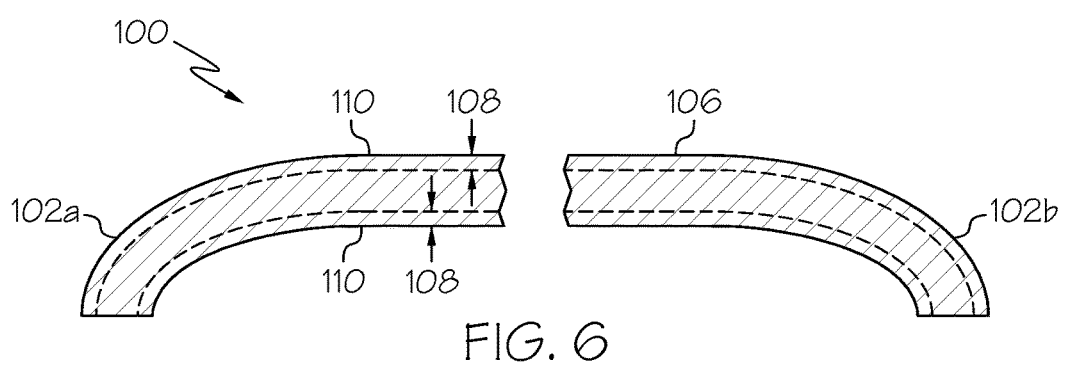
FIG. 6 schematically depicts a top cross-sectional view of a glass article having ion exchange surface layers according to one or more embodiment shown or described herein.

Optionally, in various embodiments, surface strengthening, for example by an ion exchange process, is performed on the glass article 100 after the glass article is decoupled from the mold. In one embodiment depicted in FIG. 6, the ion exchange process introduces compressive layers into the surfaces of the glass article 100 by exchanging ions in the glass. These compressive layers, referred to herein as ion exchange surface layers 110, in the surfaces of the glass article 100 have a depth of layer 108 that extends from the surface layers. Regions of the glass article 100 in which the chemically strengthening process does not introduce compressive layers may exhibit tension to compensate for the increase in compression in the ion exchange surface layers 110. The forming of the ion exchanged surface layers 110 may modify the shape of the glass article 100 so that the glass article 100 has a shape that differs from the shape of the molding region of the open-faced mold. First, chemically strengthening typically occurs at elevated temperatures, which may anneal the glass article 100, thereby reducing the internal stress introduced in a forming process, as described herein. Reducing the internal stresses may reduce the induced deflection of the glass article 100. Second, chemically strengthening the glass article 100 may result in the expansion of the glass article 100 as larger potassium ions replace smaller sodium ions. For asymmetrical shapes, a stable shape (i.e., the shape having a minimum energy) is a warped shape. Thus, in embodiments in which a chemical strengthening process is performed, the shape of the molding region of the mold 300 can differ from a target shape for the glass article 100 by a predetermined amount such that the shape of the glass article 100 after the chemically strengthening process generally corresponds to the target shape for the glass article 100 within acceptable tolerances. The shape of the molding region of the mold 300 can compensate for warp caused by subsequent chemical strengthening processes to yield a glass article 100 with a shape that corresponds to the target shape for the glass article 100.

In various embodiments, the cooling rate can be adjusted, for example, to finely tune the temperature gradient across the glass article blank 101. The methods described herein can be used, for example, as an iterative inspection parameter regime on a glass article manufacturing process. After the glass article blank 101 is cooled, and the glass article 100 is decoupled from the mold 300, the three-dimensional shape of the glass article 100 is compared to a target shape for the glass article 100. For example, the three-dimensional shape of the glass article 100 can be compared to a computer-aided design (CAD) model for the glass article 100 using conventional inspection techniques. If the shape of the glass article 100 is within acceptable tolerances, a subsequent glass article blank 101 is heated for forming. Acceptable tolerances can vary depending on the particular embodiment. For example, in various embodiments, an acceptable tolerance for the shape of the glass article 100 is within approximately 100 μm of the nominal dimensions of the CAD model, although other tolerances can be acceptable.

If the three-dimensional shape of the glass article 100 differs from the target shape by an amount outside acceptable tolerances, the flow rate is adjusted to a flow rate that generates an alternate anisothermal temperature profile for the mold 300. When glass is processed according to the method, a subsequent glass article blank 101 is heated. The subsequent glass article blank 101 is coupled to the mold 300, cooled at the second flow rate, decoupled from the mold 300, and the shape of the subsequent glass article is compared to the target shape. The method can be repeated with alternate anisothermal temperature profiles until the shape of the glass article is within the acceptable tolerances.

It should now be understood that methods of manufacturing glass articles according to the present disclosure may be used to produce glass articles having three-dimensional shapes. Glass article blanks are heated to a temperature above the setting temperature of the glass and are introduced to an open-faced mold having a shape that generally corresponds to the shape of the desired glass article. An anisothermal temperature profile is maintained along the glass article blank by the open-faced mold. The glass article blank is cooled while contact between the glass article blank and the open-faced mold is maintained. The anisothermal temperature profile of the open-faced mold may induce warp into the glass article such that the shape of the glass article differs from the shape of the open-faced mold. Various embodiment of the methods and apparatuses described herein enable glass articles to be manufactured to compensate for warp that can occur in down-stream processes. By compensating for down-stream processing warp during glass article shaping, the methods and apparatuses described herein may result in fewer non-conforming glass articles and increased manufacturing efficiencies.

In a first aspect, the disclosure provides a method of manufacturing a glass article having a three-dimensional shape includes heating a glass article blank to a temperature above a setting temperature; controlling a first portion of a molding region of an open-faced mold to have a first temperature and a second portion of the molding region of the open-faced mold to have a second temperature effective to generate an anisothermal temperature profile within the molding region, the molding region having a three-dimensional shape that generally corresponds to the shape of the glass article; coupling the glass article blank to the open-faced mold; and cooling the glass article blank while coupled to the molding region of the open-faced mold to set the shape of the glass article.

In a second aspect, the disclosure provides a method of manufacturing a glass article having a three-dimensional shape may include heating a glass article blank to a temperature above a setting temperature; controlling a first portion of an open-faced mold to have a first temperature and a second portion of the open-face mold to have a second temperature effective to generate an anisothermal temperature profile for the open-faced mold, the open-faced mold having a three-dimensional shape that differs from a target shape for the glass article; coupling the glass article blank to the open-faced mold; cooling the glass article blank to a temperature below a viscous temperature while coupled to the open-faced mold to set the shape of the glass article; and releasing the glass article from the open-faced mold.

In a third aspect, the disclosure provides the method of the first or second aspects may include cooling a portion of the open-faced mold proximate to the molding region with a fluid cooling stream.

In a fourth aspect, the disclosure provides the methods of the first through third aspects, wherein when the glass article blank is being cooled, a thermal gradient is maintained through a thickness of the glass article blank.

In a fifth aspect, the disclosure provides the methods of the first through fourth aspects, wherein when the glass article blank is being cooled, a thermal gradient is maintained across an in-plane direction of the glass article blank.

In a sixth aspect, the disclosure provides the methods of any of the first through fifth aspects further includes decoupling the glass article from the open-faced mold when a maximum temperature of the glass article is within a viscoelastic temperature range of the glass article for a given cooling rate.

In a seventh aspect, the disclosure provides the methods of any of the first through fifth aspects further includes decoupling the glass article from the open-faced mold when a maximum temperature of the glass article is within an elastic temperature range of the glass article for a given cooling rate.

In an eighth aspect, the disclosure provides the methods of any of the first through seventh aspects further includes heating the glass article blank along a side opposite a side of the glass article blank that contacts the open-faced mold.

In a ninth aspect, the disclosure provides the methods of any of the first through eighth aspects, wherein a shape of the glass article differs from the shape of the molding region of the open-faced mold.

In a tenth aspect, the disclosure provides the methods of any of the first through ninth aspects further includes forming an ion exchanged surface layer having a depth of layer into the glass article.

In an eleventh aspect, the disclosure provides the methods any of the first through tenth aspects, wherein forming the ion exchanged surface layer modifies the shape of the glass article so that the glass article has a shape that differs from the shape of the molding region of the open-faced mold.

In a twelfth aspect, the disclosure provides the methods of any of the first through eleventh aspects, wherein the molding region comprises a high contoured portion and a low contoured portion, and the glass article comprises a high stress field at positions proximate to the high contoured portion of the molding region and a low stress field at positions proximate to the low contoured portion of the molding region.

In a thirteenth aspect, the disclosure provides the method of any of the first through twelfth aspects, wherein cooling the glass article blank is performed at a first flow rate. The method may further include determining that the three-dimensional shape of the glass article differs from the target shape for the glass article; selecting a second flow rate, the second cooling rate differing from the first cooling rate, wherein the second flow rate generates an alternate anisothermal temperature profile for the open-faced mold; and cooling a subsequent glass article blank according to the second flow rate to the setting temperature while coupled to the open-faced mold to set a three-dimensional shape of a subsequent glass article.

In a fourteenth aspect, the disclosure provides the methods of any of the first through thirteenth aspects, wherein the three-dimensional shape of the glass article generally corresponds to the target shape for the glass article.

In a fifteenth aspect, the disclosure provides the methods of any of the first through fourteenth aspects, wherein heating the glass article blank to the temperature above the setting temperature comprises heating the glass article blank to a temperature at which greater than about 75% of the stresses of the glass article blank are relaxed for a given cooling rate.

In a sixteenth aspect, the disclosure provides the methods of any of the first through fifteenth aspects, wherein cooling the glass article blank to the setting temperature while coupled to the open-faced mold comprises cooling the glass article blank to a temperature at which less than approximately 20% of the stresses of the glass are relaxed for a given cooling rate.

In a seventeenth aspect, the disclosure provides a molding apparatus for forming a glass article that includes an open-faced mold comprising a molding region having a contact face that has a three-dimensional shape that generally corresponds to a shape of the glass article; a plurality of vent holes positioned within the molding region of the open-faced mold and extending through the contact face, the vent holes in fluid communication with a vacuum pump; and at least one cooling passage positioned in the open-faced mold, the at least one cooling passage includes a portion that is positioned proximate to the molding region and is fluidly isolated from the plurality of vent holes and the contact face of the open-faced mold, wherein the at least one cooling passage generates an anisothermal temperature profile across the glass article.

In an eighteenth aspect, the disclosure provides the molding apparatus of the seventeenth aspect further including a heating element positioned opposite from and spaced apart from the contact face.

In a nineteenth aspect, the disclosure provides the molding apparatuses of the seventeenth or eighteenth aspects, wherein a temperature of the contact face of the open-faced mold at a position proximate to edges of the molding region is greater than a temperature of the contact face at positions distal from the edges.

In a twentieth aspect, the disclosure provides the molding apparatus of any of the seventeenth through nineteenth aspects, wherein a temperature of the contact face of the open-faced mold at a position proximate to edges of the molding region is less than a temperature of the contact face at positions distal from the edges.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method of manufacturing a glass article having a three-dimensional shape comprising:
   heating a glass article blank to a temperature above a setting temperature;
   controlling a first portion of a molding region of an open-faced mold to have a first temperature and a second portion of the molding region of the open-faced mold to have a second temperature effective to generate an anisothermal temperature profile within the molding region, the molding region having a three-dimensional shape that generally corresponds to the three-dimensional shape of the glass article, wherein the first and second temperatures are above an ambient temperature and below the setting temperature;
   coupling the heated glass article blank to a contact face of the open-faced mold including the anisothermal temperature profile;
   maintaining an anisothermal temperature profile along the glass article blank;
   cooling a portion of the open-faced mold proximate to the molding region by directing a fluid cooling stream through a cooling passage in the open-faced mold, wherein the cooling passage comprises a portion that is positioned proximate to the molding region and is fluidly isolated from the contact face of the open-faced mold;
   adjusting a flow rate of the fluid cooling stream through the cooling passage to control the anisothermal temperature profile along the glass article blank; and
   cooling the glass article blank while coupled to the molding region of the open-faced mold to set the three-dimensional shape of the glass article, wherein when the glass article blank is being cooled, a thermal gradient is maintained through a thickness of the glass article blank thereby causing a pre-determined warp of the glass article blank that contributes to the three-dimensional shape of the glass article.

2. The method of claim 1, further comprising decoupling the glass article from the open-faced mold when a maximum temperature of the glass article is within a viscoelastic temperature range of the glass article for a given cooling rate.

3. The method of claim 1, further comprising heating the glass article blank along a side opposite a side of the glass article blank that contacts the open-faced mold.

4. The method of claim 1, wherein a shape of the glass article differs from the shape of the molding region of the open-faced mold.

5. The method of claim 1, further comprising forming an ion exchanged surface layer having a depth of layer into the glass article.

6. The method of claim 5, wherein forming the ion exchanged surface layer modifies the shape of the glass article so that the glass article has a shape that differs from the shape of the molding region of the open-faced mold.

7. The method of claim 1, wherein the molding region comprises a high contoured portion and a low contoured portion, and the glass article comprises a high stress field at positions proximate to the high contoured portion of the molding region and a low stress field at positions proximate to the low contoured portion of the molding region.

8. A method of manufacturing a glass article having a three-dimensional shape comprising:
   heating a glass article blank to a temperature above a setting temperature;
   controlling a first portion of an open-faced mold to have a first temperature and a second portion of the open-face mold to have a second temperature effective to generate an anisothermal temperature profile for the open-faced mold, the open-faced mold having a three-dimensional shape that differs from a target shape for the glass article, wherein the first and second temperatures are above an ambient temperature and below the setting temperature;
   coupling the heated glass article blank to a contact face of the open-faced mold having the anisothermal temperature profile;
   maintaining an anisothermal temperature profile along the glass article blank;
   cooling a portion of the open-faced mold proximate to the molding region by directing a fluid cooling stream through a cooling passage in the open-faced mold, wherein the cooling passage comprises a portion that is positioned proximate to the molding region and is fluidly isolated from the contact face of the open-faced mold;
   adjusting a flow rate of the fluid cooling stream through the cooling passages to control the anisothermal temperature profile along the glass article blank;

cooling the glass article blank to a temperature below a viscous temperature while coupled to the open-faced mold to set the three-dimensional shape of the glass article, wherein when the glass article blank is being cooled, a thermal gradient is maintained through a thickness of the glass article blank thereby causing a pre-determined warp of the glass article blank that contributes to the target shape of the glass article; and releasing the glass article from the open-faced mold.

9. The method of claim 8, wherein cooling the glass article blank is performed at a first flow rate, the method further comprising:

determining that the three-dimensional shape of the glass article differs from the target shape for the glass article; and selecting a second flow rate, the second cooling rate differing from the first cooling rate, wherein the second flow rate generates an alternate anisothermal temperature profile for the open-faced mold; and cooling a subsequent glass article blank according to the second flow rate to the setting temperature while coupled to the open-faced mold to set a three-dimensional shape of a subsequent glass article.

10. The method of claim 8, wherein the three-dimensional shape of the glass article generally corresponds to the target shape for the glass article.

11. The method of claim 8, wherein heating the glass article blank to the temperature above the setting temperature comprises heating the glass article blank to a temperature at which greater than about 75% of the stresses of the glass article blank are relaxed for a given cooling rate.

12. The method of claim 8, wherein cooling the glass article blank to the setting temperature while coupled to the open-faced mold comprises cooling the glass article blank to a temperature at which less than approximately 20% of the stresses of the glass are relaxed for a given cooling rate.

* * * * *